US010161597B2

(12) United States Patent
Park et al.

(10) Patent No.: US 10,161,597 B2
(45) Date of Patent: Dec. 25, 2018

(54) LIGHTING SYSTEM AND SELECTIVE RETRO-REFLECTION APPARATUS

(71) Applicant: GWANGJU INSTITUTE OF SCIENCE AND TECHNOLOGY, Buk-gu, Gwangju (KR)

(72) Inventors: Sang Ki Park, Gwangju (KR); Sun Kyu Lee, Gwangju (KR); Sung Ki Nam, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 493 days.

(21) Appl. No.: 14/826,206

(22) Filed: Aug. 14, 2015

(65) Prior Publication Data

US 2016/0053972 A1 Feb. 25, 2016

(30) Foreign Application Priority Data

Aug. 21, 2014 (KR) ........................ 10-2014-0108888
Aug. 21, 2014 (KR) ........................ 10-2014-0108889

(51) Int. Cl.
*B60Q 1/04* (2006.01)
*F21V 13/12* (2006.01)
(Continued)

(52) U.S. Cl.
CPC ............ *F21V 13/12* (2013.01); *F21S 41/285* (2018.01); *F21S 41/322* (2018.01);
(Continued)

(58) Field of Classification Search
CPC ........... B60Q 1/04; F21S 48/1731; F21V 7/00
USPC ........................................ 362/464, 509, 516
See application file for complete search history.

(56) References Cited

U.S. PATENT DOCUMENTS 6,287,670 B1 9/2001 Benson et al.
6,656,571 B2 12/2003 Benson et al.
(Continued)

FOREIGN PATENT DOCUMENTS

JP 2002535692 A 10/2002
JP 2010170905 A 9/2010
(Continued)

OTHER PUBLICATIONS

Korean Patent Office, Notice of Allowance, dated Jan. 30, 2018, 2 pages, Republic of Korea.
(Continued)

*Primary Examiner* — William Carter
(74) *Attorney, Agent, or Firm* — Loza & Loza, LLP; Heidi L. Eisenhut

(57) ABSTRACT

A lighting system and a selective retro-reflection apparatus are provided. The lighting system includes a lamp, a reflector configured to reflect light emitted by the lamp, a projection lens configured to emit the reflected light of the reflector in a predetermined direction, and a selective shield apparatus disposed between the projection lens and the reflector and provided on a path of light directed upward among the light reflected from the reflector to selectively shield the light directed upward, wherein the selective shield apparatus includes a panel and a selective shield portion supported by the panel, positions of the panel and the selective shield portion are fixed, and a state in which the selective shield portion transmits the light is changed according to whether power is supplied.

11 Claims, 11 Drawing Sheets

(51) Int. Cl.

| | |
|---|---|
| ***F21V 5/00*** | (2018.01) |
| ***F21S 41/20*** | (2018.01) |
| ***F21S 41/32*** | (2018.01) |
| ***F21S 41/33*** | (2018.01) |
| ***F21S 41/64*** | (2018.01) |
| ***F21S 45/43*** | (2018.01) |

(52) U.S. Cl.

CPC ........... *F21S 41/337* (2018.01); *F21S 41/645* (2018.01); *F21S 45/43* (2018.01); *F21V 5/00* (2013.01)

(56) References Cited

U.S. PATENT DOCUMENTS

2001/0026860 A1 10/2001 Benson et al.
2011/0127912 A1* 6/2011 Lee ...................... F21S 48/1159 362/509
2013/0107559 A1* 5/2013 Gava .................. F21S 48/1731 362/516

FOREIGN PATENT DOCUMENTS

| | | | |
|---|---|---|---|
| JP | 2012002892 | A | 1/2012 |
| KR | 1019990077381 | | 5/2004 |
| KR | 2010-0124958 | A | 11/2010 |
| KR | 20110074595 | A | 6/2011 |
| KR | 20110084785 | A | 7/2011 |
| KR | 20130009131 | A | 1/2013 |
| KR | 2013-0047521 | A | 5/2013 |
| WO | WO1997026567 | | 7/1997 |

OTHER PUBLICATIONS

S.K. Park et al. , Design of Micro-Optical Array for Fabrication of Switchable Glass, May 16, 2014, 4 pages, Korean Society for Precision Engineering, Republic of Korea.

* cited by examiner

LIGHTING SYSTEM AND SELECTIVE RETRO-REFLECTION APPARATUS

CROSS-REFERENCE TO RELATED APPLICATION(S)

This application claims priority under 35 U.S.C. § 119 to Korean Application No. 10-2014-0108888, filed in Korea on Aug. 21, 2014 and Korean Application No. 10-2014-0108889, filed in Korea on Aug. 21, 2014 whose entire disclosure is hereby incorporated by reference.

BACKGROUND

1. Field

The inventive concept relates to a lighting system and a selective retro-reflection apparatus which is preferably applied to the lighting system and is capable of selectively retro-reflecting incident light.

2. Background

A lighting system is an apparatus used for a vehicle, and is classified into a reflector type and a projection type. Recently, the lighting system having the projection type is mainly used due to advantages such as an emitting distance, a size, and a design, etc.

Meanwhile, the vehicle requires a high beam so that a driver sees a long distance. Since the high beam obstructs vision of a driving vehicle of an opposite side, the high beam is used only when necessary, and in a normal driving, only a low beam is used. As such, in order to separately implement the high beam and the low beam, a separate lighting system may be implemented in the front of the vehicle, but, there are disadvantages such as a problem of a narrow volume of the front of the vehicle, a problem of a design constraint, and an increase of a manufacturing cost, in this method. Accordingly, a method capable of implementing both the high beam and the low beam using a single lighting system is needed.

Under this background, In order to implement the low beam as the single lighting system having the projection type, a cut-off line shield is needed, and in order to solve the problem, the lighting system having a bi-function type has been emerged. The lighting system having the bi-function type is a system in which both the high beam and the low beam are implemented by physically manipulating the cut-off line shield. The method is desirably applied to the lighting system to which a high intensity discharge (HID) lamp which recently draws interest of a consumer is applied. An example of implementing the lighting system having the projection type as the bi-function type is disclosed in Korean Patent Publication No. 10-2013-0009131 titled "a shield driving apparatus of a headlamp." A shield shielding light (refer to 20 of FIGS. 1 and 100 of FIG. 30) using a cut-off line as a limit is disclosed in the cited reference. The shield is stood when shielding the high beam using the cut-off line as the limit and the high beam is irradiated by being inclined when transmitting the high beam.

However, a noise problem occurs since the shield mechanically operates in technology according to the cited reference, there is a problem in which a narrow inner space of the lighting system is unnecessarily encroached. Particularly, since the noise problem is propagated to the inside in a form of mechanical vibration of a vehicle body, this acts as a problem of decreasing a feeling of satisfaction for emotional driving of a driver.

SUMMARY

Exemplary embodiments of the inventive concept are provided to a lighting system capable of improving a function of the lighting system, for example, capable of solving a noise problem and a space shortage problem, increasing emotional satisfaction of a driver, increasing completion of a vehicle, and contributing to production of a high-end product.

According to one aspect of the inventive concept, there is provided a lighting system including: a lamp; a reflector configured to reflect light emitted by the lamp; a projection lens configured to emit the reflected light of the reflector in a predetermined direction; and a selective shield apparatus disposed between the projection lens and the reflector, provided on a path of light directed upward among lights reflected from the reflector, and configured to selectively shield the light directed upward, wherein the selective shield apparatus includes a panel and a selective shield portion supported by the panel, positions of the panel and the selective shield portion are fixed, and a state in which the selective shield portion transmits the light is changed according to whether power is supplied.

According to another aspect of the inventive concept, there is provided a lighting system including: a lamp; and a selective shield apparatus provided on a path of light directed upward among lights radiated from the lamp, wherein a transparent state of the selective shield apparatus is changed according to power supplied from the outside.

According to still another aspect of the inventive concept, there is provided a selective retro-reflection apparatus, including: an incident panel having at least one reflection structure capable of reflecting incident light; a fluid pocket provided on a lower portion of the incident panel along a light path of the incident light, and configured to adjust a state of an interface between the reflection structure and the fluid by selectively filling fluids different from each other; an emitting panel provided on a lower portion of the fluid pocket with respect to the incident light; and a structure configured to provide and emit the fluid to the fluid pocket.

According to yet another aspect of the inventive concept, there is provided a lighting system, including: a lamp; a reflector configured to reflect light emitted by the lamp; a projection lens configured to emit the reflected light of the reflector in a predetermined direction; and a selective retro-reflection apparatus provided on a light path of light directed upward so that light emitted as light directed upward among lights emitted from the lamp is emitted as light directed downward, wherein the selective retro-reflection apparatus includes: at least one panel having at least one reflection structure capable of reflecting incident light; and a fluid pocket configured to adjust a state of an interface between the reflection structure and the fluid, and adjust a reflection state of the incident light by alternately filling two kinds of fluids different from each other.

The lighting system of the inventive concept may improve the noise problem and the space problem, increase the emotional satisfaction of the consumer, and improve the design limitation factor of the vehicle. Further, according to embodiments, the heating problem, the low luminance problem, the energy efficiency problem, and the manufacturing cost problem may be improved. The selective retro-reflection apparatus of the inventive concept may be applied to various fields in which functions of the transmission and the retro-reflection are required like the lighting system for the vehicle. Further, there may be advantages in which the straightness of the light is great in the transmissible state, and shield performance in the non-transmission state is great. Moreover, industrial applicability may be increased due to a low manufacturing cost and a simple manipulation.

BRIEF DESCRIPTION OF THE DRAWINGS

Embodiments will be described in detail with reference to the following drawings in which like reference numerals refer to like elements, and wherein.

DETAILED DESCRIPTION OF THE INVENTION

Hereinafter, embodiments will be described in detail with reference to the accompanying drawings. The embodiments may, however, be embodied in many different forms and should not be construed as being limited to the embodiments set forth herein; rather, those skilled in the art will easily offer alternative embodiments falling within the spirit and scope by adding, modifying, and/or deleting a component, and it is also included in the spirit of the inventive concept.

First Embodiment

Figure 1:
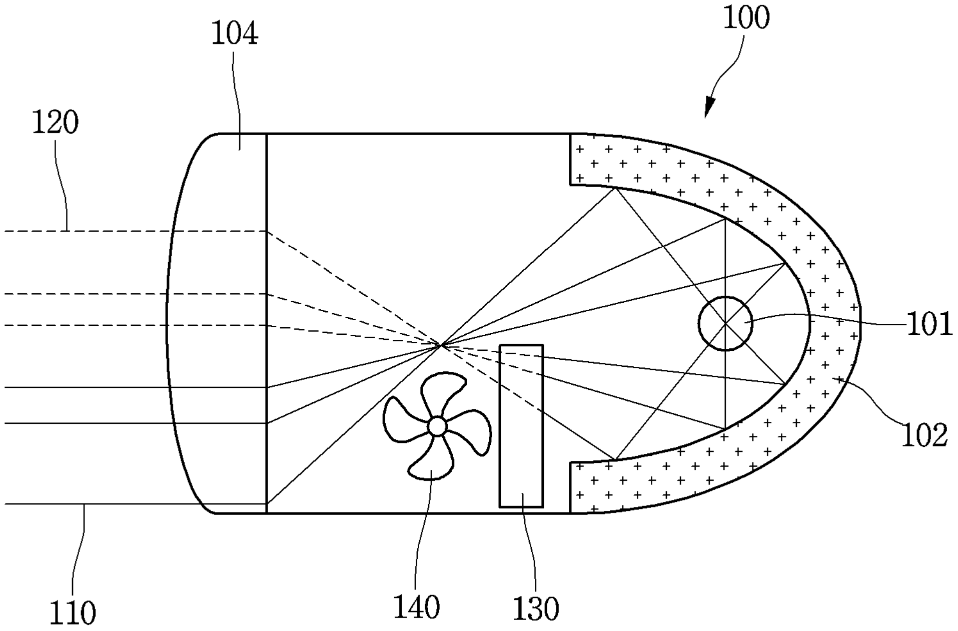
FIG. 1 is a diagram for describing a lighting system according to a first embodiment.

FIG. 1 is a diagram for describing a lighting system according to a first embodiment.

Referring to FIG. 1, a lighting system 100 may include a lamp 101 irradiating light, a reflector 102 emitting in one direction by reflecting the light radiating in various directions from the lamp, and a projection lens 104 increasing straightness by controlling a refractive index of the light. A selective shield apparatus 130 may be disposed in any location on a light path of light directed upward 120 from an emitting side of the reflector 102. Here, the lighting system 100 may be desirably applied to a vehicle. The selective shield apparatus 130 may be an apparatus for selectively shielding the light progressing as the light directed upward by being reflected from the reflector 102, and transmit the light when the light directed upward 120 is needed and not transmit the light when the light directed upward 120 is not needed.

Meanwhile, since the selective shield apparatus 130 does not perform a self-mechanical operation, a position of each component may be fixed. For example, there may not be a rotational operation of moving based on a predetermined rotation axis, or a translational operation of moving in one direction. Accordingly, since mechanical noise does not occur while the selective shield apparatus 130 operates, there is no noise of the apparatus in which the shield apparatus is installed, and emotional satisfaction of a consumer may be increased. Further, since a separate empty space is not needed for the operation of the selective shield apparatus 130, there may be an advantage in which a space in which the lighting system occupies is decreased, and accordingly, there may further be an advantage in which the vehicle in which the lighting system is installed becomes small.

An operation of the lighting system will be described. The selective shield apparatus 130 may be manipulated as a transmissible state when the lighting system 100 should perform a function of a high beam, and project the light directed upward 120 by transmitting the light reflected from the reflector 102. The selective shield apparatus 130 may be manipulated as a non-transmission state when the lighting system 100 should perform only a function of a low beam. When the lighting system 100 performs only the function of the low beam, the selective shield apparatus 130 may not transmit the light directed upward 120 and transmit only light directed downward 110 by not transmitting the light reflected from the reflector 102. Here, the light directed upward is represented by dotted lines in FIG. 1.

A cooling device 140 may be further included in an adjacent position of the selective shield apparatus 130 in order to cool heat generated in the selective shield apparatus 130 by shielding the light in the selective shield apparatus 130.

Figure 2:
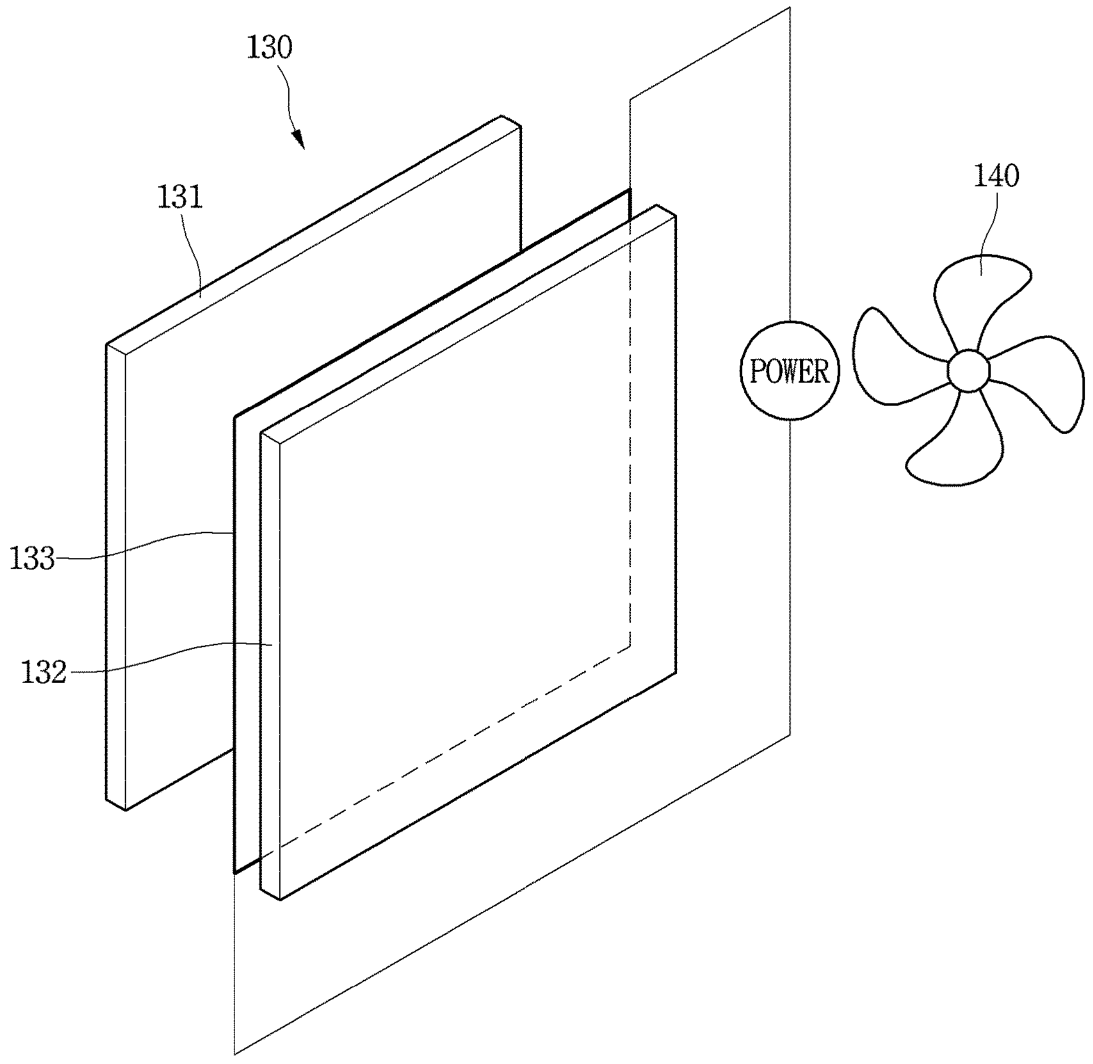
FIG. 2 is a diagram illustrating a configuration of a selective shield apparatus in more detail.

FIG. 2 is a diagram for describing a configuration of a selective shield apparatus in more detail. In the drawing, an example in which components are separated from each other is illustrated, but this is for convenience of explanation, and components may be attached to each other or may be spaced apart by a very small distance from each other.

Referring to FIG. 2, a shape of the selective shield apparatus 130 may be maintained by providing a front panel 132 and a rear panel 131 in the selective shield apparatus 130, and a selective shield portion 133 may be provided in a space portion between the front panel 132 and the rear panel 131. Positions of the selective shield portion 133, the front panel 132, and the rear panel 131 may be fixed without any mechanical operation. The panels 131 and 132 may be a transparent material such as glass or polymethyl methacrylate (PMMA), etc. A state in which the selective shield portion 133 transmits the light may be selectively changed by power supplied from the outside. The cooling device 140 may be provided around the selective shield apparatus 130, and cool the heat generated when the light is shielded by the selective shield portion 133.

Examples of a configuration of the selective shield portion 133 will be proposed.

As one example, the selective shield portion 133 may use a polymer dispersed liquid crystal (PDLC) method. The PDLC method may be provided as a structure in which a plurality of liquid crystal molecular particles are dispersed in a polymer. The liquid crystal molecular particles may have an irregular direction when there is no voltage, and may have the non-transmission state in which the light is not transmitted due to a scattering occurring at an interface having a refractive index different from that of a medium. On the other hand, the liquid crystal molecular particles may have a regular direction when a voltage is applied, and may have the transmissible state in which the light is transmitted since the refractive index of the interface is equal to that of the medium. That is, a transparent state of the selective shield portion 133 is changed, and accordingly, the state in which the selective shield portion 133 transmits the light may be changed by changing only the voltage applied from the outside using the feature.

As another example, the selective shield portion 133 may use a suspended particle display (SPD) method. The SPD method may be a method in which the selective shield portion 133 has a colored state by scattering or absorbing the light incident by optical polarizing particles present in a micro droplet when the voltage is not applied, and has the non-transmission state in which the light is not transmitted. On the other hand, the selective shield portion 133 may have the transmissible state in which the light is transmitted since incident light is transmitted as it is while optical polarizing particles are arranged in a regular direction when the voltage is applied. That is, a transparent state of the selective shield portion 133 is changed, and accordingly, the state in which the selective shield portion 133 transmits the light may be changed by changing only the voltage applied from the outside using the feature.

As still another example, the selective shield portion 133 may use an electrochromic (EC) method. The EC method may be a method of absolutely determining transmission amounts of the light by changing a two-dimensional area in which an EC material occupies according to a voltage applied from the outside. That is, a state in which the light is transmitted may be changed by using the feature in which the transparent state of the selective shield portion 133 is changed.

According to the method described above, whether the selective shield portion 133 transmits the light may be determined according to whether external power is applied. Accordingly, when the light directed upward 120 is needed, the selective shield portion 133 may transmit the light, and when the light directed upward 120 is not needed, the selective shield portion 133 may not transmit the light. Of course, even when the selective shield portion 133 is in the non-transmission state, the selective shield portion 133 may not completely shield the light, but the light directed upward 120 may not be used since the selective shield portion 133 is in the non-transmission state and the straightness is weak due to the scattering of the light.

As described above, the selective shield apparatus 130 is applied, and whether to irradiate the light directed upward 120 may be selectively manipulated by changing only whether to supply the power without the mechanical operation and changing the state in which the selective shield portion 133 transmits the light.

Second Embodiment

Figure 3:
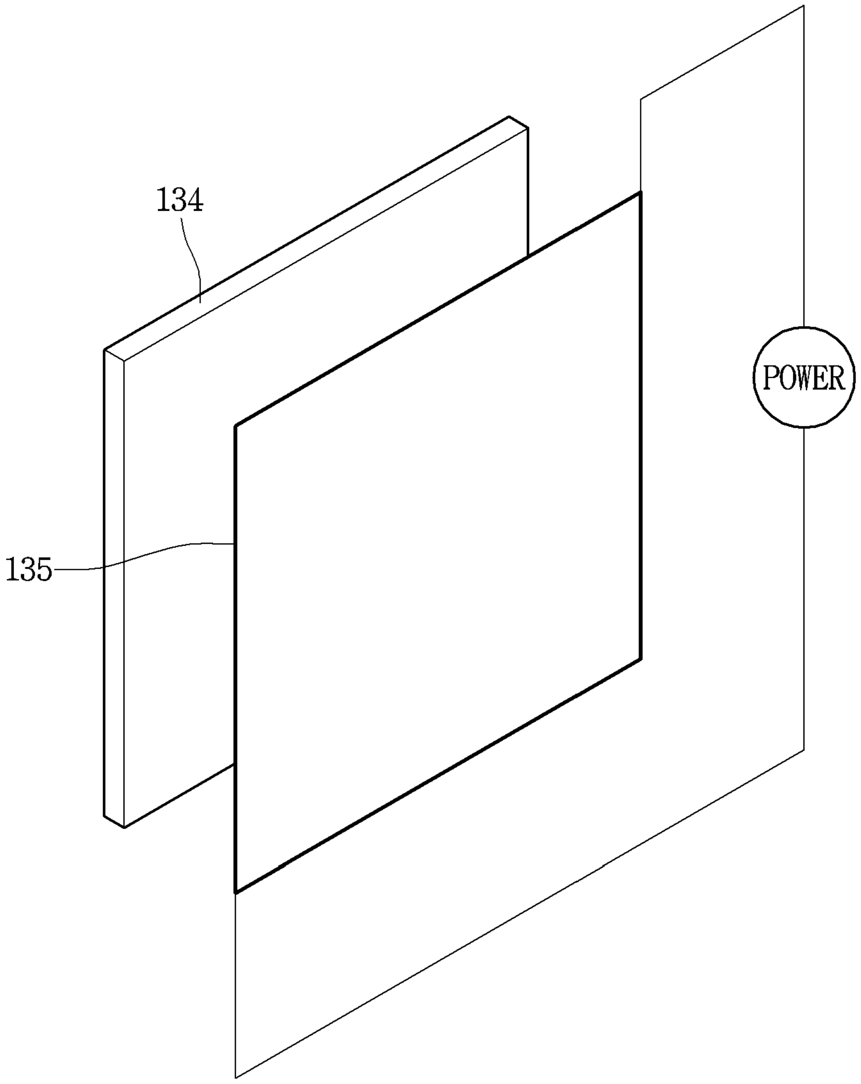
FIG. 3 is a diagram illustrating a selective shield apparatus which is applied to a second embodiment.

FIG. 3 is a diagram illustrating a selective shield apparatus 130 which is applied to a second embodiment of the inventive concept.

Referring to FIG. 3, the second embodiment of the inventive concept may be configured by excluding any one of the panels 131 and 132 from the first embodiment of the inventive concept. For example, when using the PDLC method, a function of the excluded any one portion may be performed by attaching a selective shield portion 135 to any one surface of a single panel 134.

In the second embodiment, a thickness of the selective shield apparatus 130 may be further decreased while maintaining the advantage of the first embodiment as it is, and since the selective shield portion 135 generating heat is exposed to the outside and it is enough to cool the heat by a natural wind from the outside while driving, the separate cooling device (refer to 140 of FIG. 1) may not be needed. In this case, the noise problem may not occur at all, and the size of the lighting system may be further decreased.

Third Embodiment

A third embodiment of the inventive concept may have the same configuration as the first embodiment or the second embodiment except for a distinctively different configuration of the selective shield apparatus 130. Accordingly, the description of the embodiments described above may be applied to a portion in which there is no detailed description at it is, or may be modified and applied thereto, and accordingly, only a distinctive portion of the inventive concept will be described.

In the first embodiment and the second embodiment, there may be a problem in which the light shielded by the selective shield apparatus 130 is disappeared as the heat. It may not be desirable in terms of energy use efficiency. Further, there may be a problem in which it is necessary to select a high-intensity lamp when selecting the lamp 101 in order to obtain a sufficient illumination as a general low beam using only the light directed downward 110. This may cause cost increase. In the third embodiment, in order to solve the problems, since retro-reflected light (refer to 121 of FIG. 4) is also used as the low beam together with the light directed downward 110 by retro-reflecting the light reflected from the selective shield apparatus 130, the illumination of the low beam may be further increased. Accordingly, it may not be necessary to select the high-intensity lamp when selecting the lamp 101, and the lighting system may be implemented at a low cost.

Figure 4:
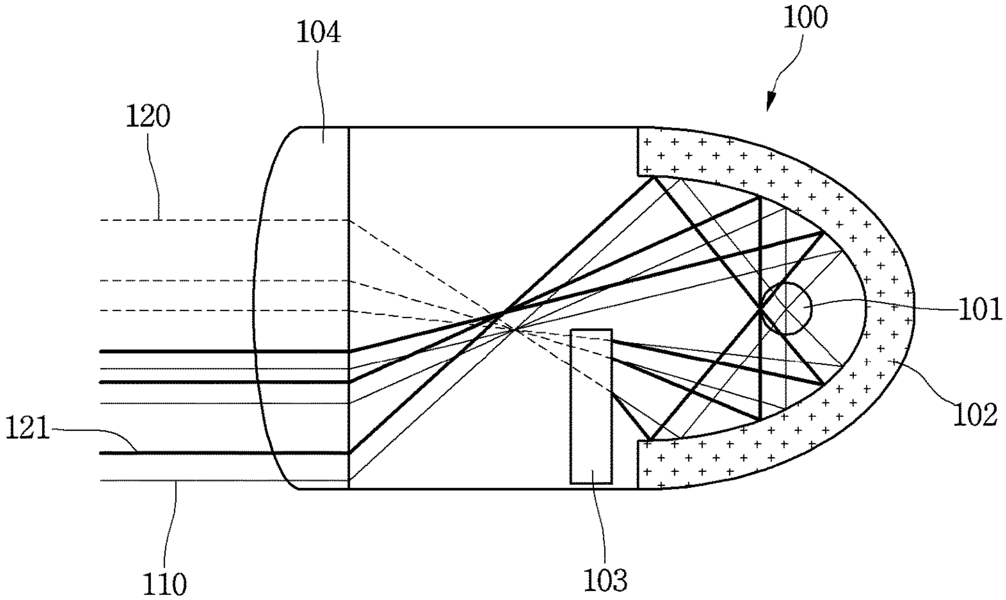
FIG. 4 is a diagram illustrating a lighting system according to a third embodiment.

FIG. 4 is a diagram illustrating a lighting system according to a third embodiment.

Referring to FIG. 4, the lighting system 100 may include a lamp 101 irradiating light, a reflector 102 collecting the light radiating in every direction from the lamp 101, and a projection lens 104 increasing straightness of the light. Further, a selective retro-reflection apparatus 103 retro-reflecting the light shielded when shielding the light as one kind of the selective shield apparatus 130 may be disposed in one portion on an emitting path of the light directed upward 120.

An operation of the lighting system 100 will be described. The selective retro-reflection apparatus 103 may be manipulated as the transmissible state when the lighting system 100 performs the function of the high beam, so that the user may use the light directed upward 120. The selective retro-reflection apparatus 103 may be manipulated as the non-transmission state when the lighting system 100 performs only the function of the low beam. When the lighting system 100 performs only the function of the low beam, the light reflected from the selective retro-reflection apparatus 103 may be used as the low beam together with the light directed downward 110. Accordingly, the illumination of the low beam may be further increased. Further, the high cost and the high-intensity lamp may not be used. In FIG. 4, the retro-reflected light 121 is remarkably represented in order to represent the differentiation with another light.

Figure 5:
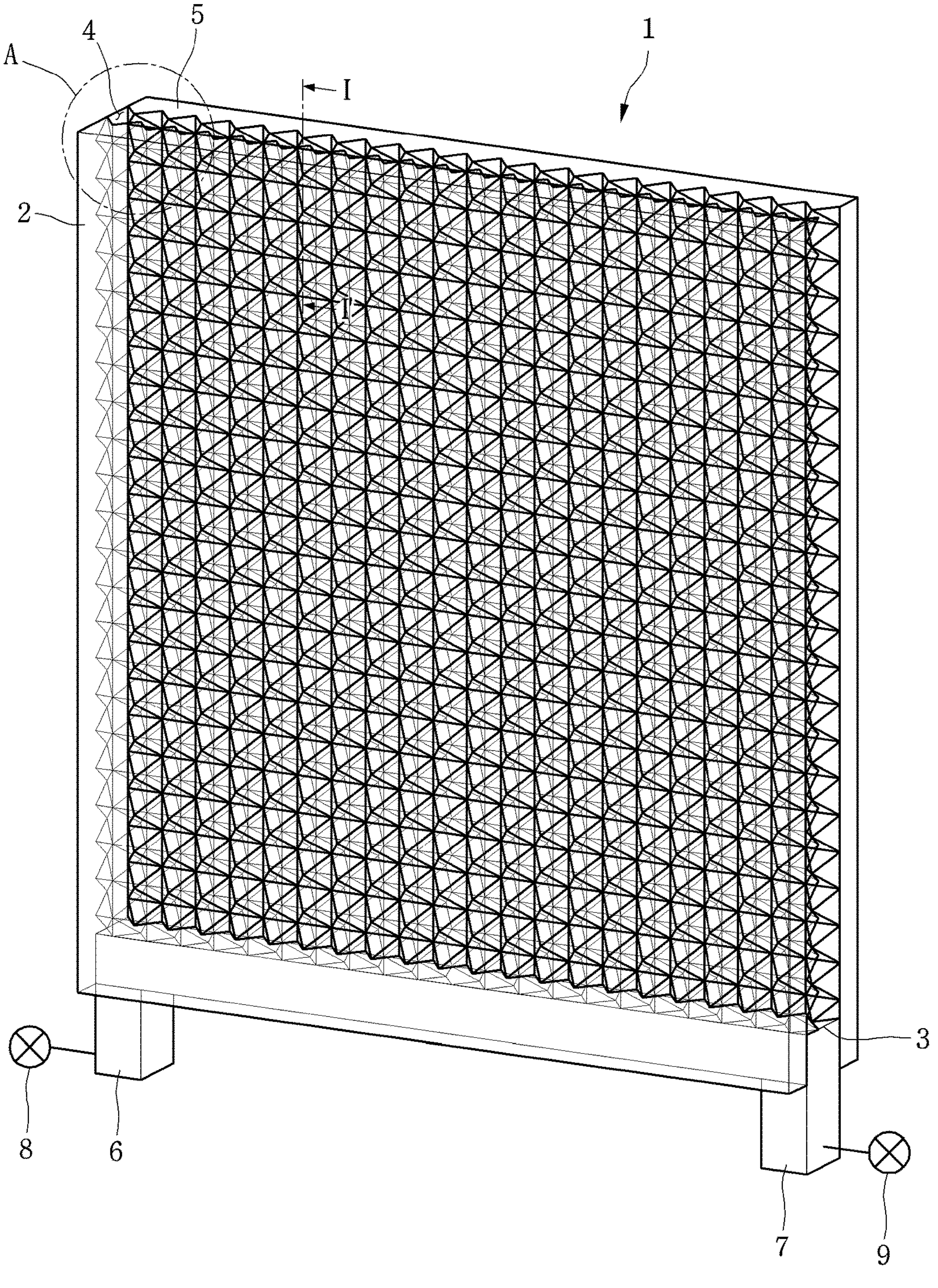
FIG. 5 is a diagram illustrating a selective retro-reflection apparatus according to a third embodiment.

FIG. 5 is a diagram illustrating a selective retro-reflection apparatus according to a third embodiment.

Referring to FIG. 5, a selective retro-reflection apparatus 1 may include an incident panel 2 provided to a side in which light is incident, an emitting panel 5 provided to a side in which the light is emitted, and a fluid pocket 4 provided in a space portion between the incident panel 2 and the emitting panel 5. The fluid pocket 4 may be a portion provided by including at least a space defined as the inside of the incident panel 2, the emitting panel 5, and a housing 3, and its inside may be filled by selecting from various kinds of fluids. The fluid filling the fluid pocket 4 may be a liquid such as water, ethanol, etc., and a general gas such as air. The transmissible state of the incident light may be manipulated according to an operation of the selective retro-reflection apparatus 1 based on the fluid filling the fluid pocket 4. A retro-reflection state may be included in the transmissible state.

A fluid inlet 6 and a suction valve 8 controlling a flow of the fluid passing through the fluid inlet 6 may be provided in any one side of the fluid pocket 4, and a fluid outlet 7 and an outlet valve 9 controlling a flow of the fluid passing through the fluid outlet 7 may be provided in any other side of the fluid pocket 4. Although not shown, a pump controlling a flow of the fluid may be further provided. The fluid inlet 6, the suction valve 8, the fluid outlet 7, and the outlet valve 9 may manipulate inflow and outflow of the fluid supplied to the inside of the fluid pocket 4. Another inflow/outflow structure may also be applied besides the structure described above.

An operation of the selective retro-reflection apparatus 1 will be described in brief. When there is air in which a refractive index is 1 in the fluid pocket 4, the light incident to the incident panel 2 may be retro-reflected by being totally reflected at the interface between the fluid pocket 4 and the incident panel 2 according to a Snell's law. When there is water in which the refractive index is 1.3 in the fluid pocket 4, the light incident to the incident panel 2 may penetrate to the fluid pocket 4 by passing through the interface between the fluid pocket 4 and the incident panel 2 according to the Snell's law, and be emitted by again passing through the interface between the fluid pocket 4 and the emitting panel 5. The operation may use a feature in which the total reflection occurs at the interface when the incident light has an incident angle which is beyond a critical angle due to differences of the refractive index of the fluid filling the fluid pocket 4, the refractive indexes of the incident panel 2 and the emitting panel 5, and the refractive index of the outside gas (generally, the air in which the refractive index is 1).

Figure 6:
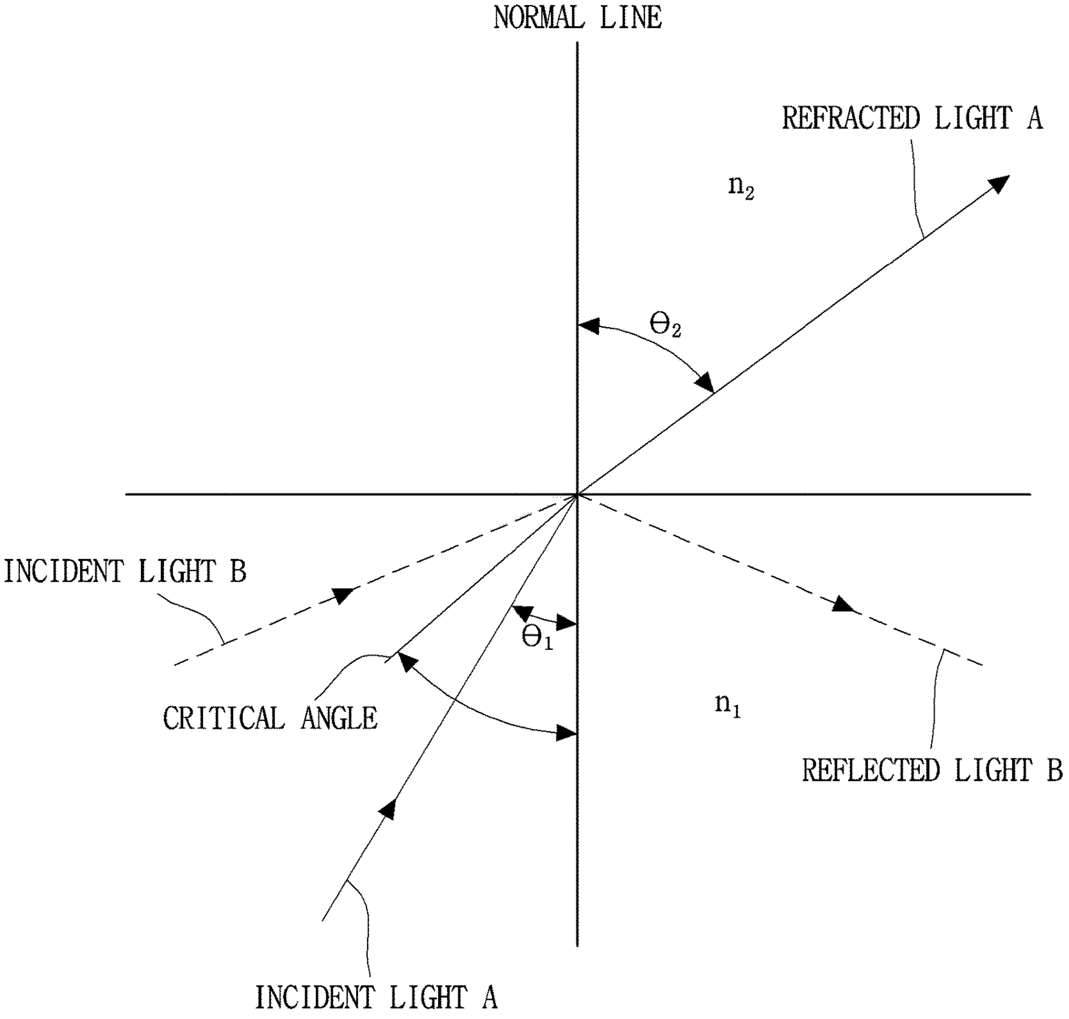
FIG. 6 is a diagram for describing an example in which total reflection occurs at an interface of a material.

FIG. 6 is a diagram for describing an example in which total reflection occurs at an interface of a material.

Referring to FIG. 6, an example in which the refractive index of the incident panel 2 is n1, and the refractive index of the fluid filling the fluid pocket is n2 will be described. When an incident angle of incident light A is θ1 and an emitting angle of refractive light A passing through the interface between the incident panel 2 and the fluid pocket 4 is θ2, the incident angle and the emitting angle may satisfy the following Equation 1.

$$n_1 \sin \theta_1 = n_2 \sin \theta_2 \quad \text{[Equation 1]}$$

When the n1 and n2 are given, there may be the incident angle in which θ2 is 90 degrees, and in this case, the incident angle θ1 may be referred to as the critical angle. When the incident angle of the incident light is beyond the critical angle, the incident light may be totally reflected, and the light passing through the interface may be disappeared.

When following the Equation 1, the incident panel is the PMMA and its refractive index is 1.5, and the air in which the refractive index is 1 fills the fluid pocket 4, the Equation 1 may be 1.5 sin θ1=sin 90°. Accordingly, when the incident angle of the incident light is about 40 degrees, the total reflection may occur. Further, when the incident panel is the PMMA and its refractive index is 1.5, and the water in which the refractive index is 1.3 fills the fluid pocket 4, the Equation 1 may be 1.5 sin θ1=1.3 sin 90°. Accordingly, when the incident angle of the incident light reaches about 60 degrees, the total reflection may occur. The critical angle may be slightly changed by calculating an exact numerical value or reflecting the illumination of a surface, but may be changed according to the fluid filling the fluid pocket 4, and accordingly, it may be distinctly understood that a condition of the total reflection of the incident light is changed. As one aspect of the inventive concept, a structure of the interface and a state of the fluid, etc. capable of optimally satisfying a condition of the total reflection of the incident panel 2, the fluid pocket 4, and the emitting panel 5 may be considered.

An operation of the total reflection described above will be described by being associated with the operation of the selective retro-reflection apparatus.

A predetermined reflection structure 10 may be formed in a side of the incident panel 2 at the interface between the incident panel 2 and the fluid pocket 4, and the inside of the fluid pocket 4 may be selectively filled with the water. When the inside of the fluid pocket 4 is not filled with the water, the inside of the fluid pocket 4 may be filled with the air. Since the critical angle is changed according to the fluid filling the fluid pocket 4, when the reflection angle of the reflection structure 10 with respect to the incident light incident horizontally is set as an angle between the critical angle with respect to the water and the critical angle with respect to the air, the total reflection state of the incident light may be adjusted. In detail, when the inside of the fluid pocket 4 is selectively filled with the air, the critical angle may be 40 degrees and the incident light may be totally reflected at the interface (the interface between the incident panel and the fluid pocket), and when the inside of the fluid pocket 4 is selectively filled with the water, the critical angle may be about 60 degrees and the incident light may penetrate the interface with a predetermined refraction angle. Further, since the light can be retro-reflected through two times of total reflections, a reflection angle of the reflection structure 10 with respect to the incident light may be set as an angle between 40 degrees and 50 degrees when considering a second reflection after a first reflection.

As described above, a selective retro-reflection effect may be obtained by manipulating a state of the interface of the incident panel 2, the fluid pocket 4, and the emitting panel 5 through the fluid filling the fluid pocket 4.

Figure 7:
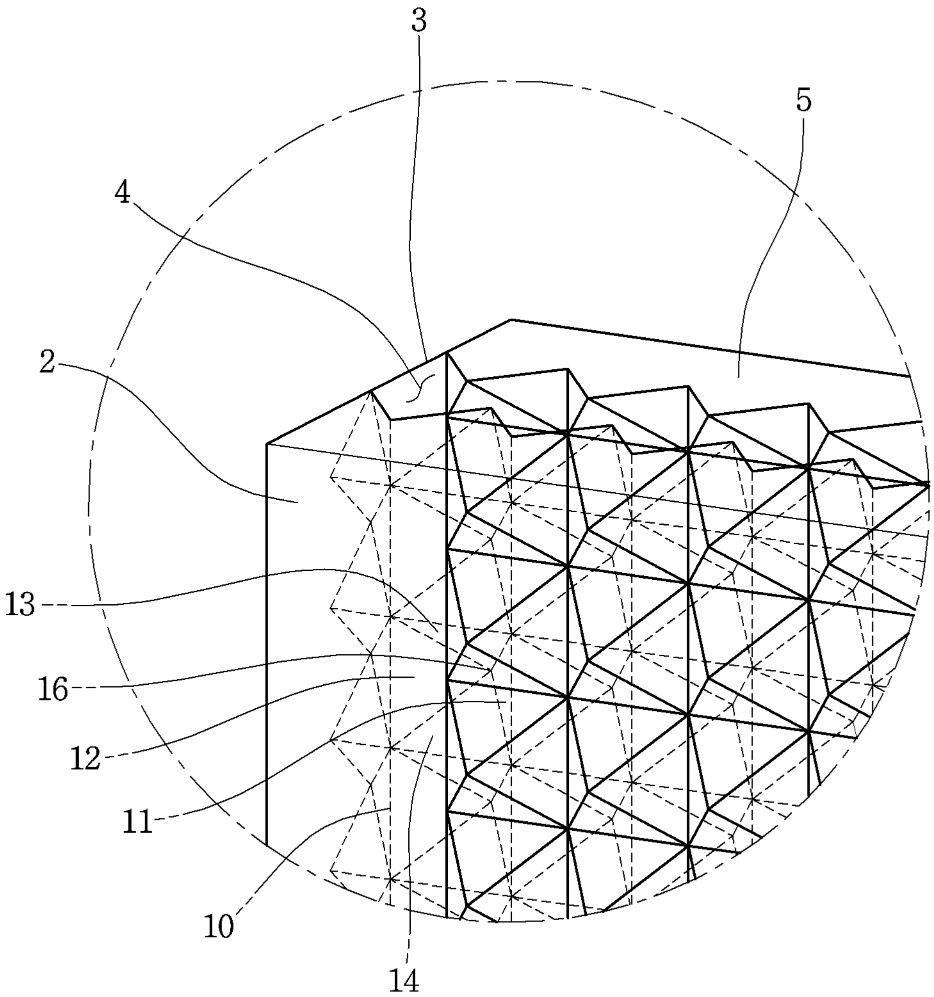
FIG. 7 is a diagram enlarging a portion “A” of FIG. 5.

FIG. 7 is a diagram enlarging a portion "A" of FIG. 5.

Referring to FIG. 7, although the incident panel 2 and the emitting panel 5 are transparent materials and it is difficult to understand the drawing, the reflection structure 10 may be a structure in which one vertex 16 is projected from the incident panel 2 toward the fluid pocket 4, and have four reflection surfaces 11, 12, 13, and 14 which are in a pyramid shape. The reflection structure 10 may be continuously formed in horizontal and vertical directions. The four reflection surfaces 11, 12, 13, and 14 may have a shape sharing the vertex (the vertex of the pyramid shape) 16.

When the total reflection is performed and the incident light is incident to any one reflection surface (for example, a first reflection surface 11) of the reflection structure 10, the incident light may reach other reflection surfaces 12, 13, and 14 by being totally reflected, and be again reflected by being totally reflected in the other reflection surfaces 12, 13, and 14. In other words, the incident light may be retro-reflected through two reflection operations in any one reflection structure 10. In more detail, when the incident light incident to the first reflection surface 11 is totally reflected, there may be a high probability in which the incident light is incident to the second reflection surface 12. However, since the incident angle of every incident light is not vertical to the incident panel 2, there may be a probability in which the incident light is incident to the other reflection surfaces 13 and 14. In this case, in order to increase retro-reflection performance, the reflection structure 10 may be formed in the pyramid shape having a plurality of reflection surfaces as shown in FIG. 7.

As a comparative example, the reflection structure 10 in which the reflection surfaces having a shape of triangle prism are continuously arranged in one direction may be provided (that is, when the number of the reflection surfaces is two), as an experimental example, an example of FIG. 3 may be provided (that is, the number of the reflection surfaces is four), and when simulating an amount of the light which is totally reflected by setting angles of the reflection surfaces as 45 degrees and a range of the incident angle of the incident angle as 90±5 degrees, the retro-reflection performance of the comparative example may be a half level of that of the experimental example. Accordingly, as the number of the reflection surfaces in the reflection structure 10 is increased, the retro-reflection performance may be improved. However, the shape of the triangle prism may not be excluded from the inventive concept, and may be applied to another embodiment of the inventive concept except for a case in which the retro-reflection performance deteriorates.

The reflection structure 10 may have various shapes such as a pentagonal pyramid shape, a hexagonal pyramid shape, etc. in addition to a quadrangular pyramid shape illustrated as the pyramid shape. However, in terms of convenience of production, the pyramid shape capable of being provided as two processes of a horizontal process and a vertical process may be more preferable in convenience of the process.

Meanwhile, it may be desirable that the angle at which the reflection surface is provided is 45 degrees since most of retro-reflected lights are reflected from two reflection surfaces and are emitted by being reflected in time series, and thus the second total reflection may be effectively performed and an amount of the light of the retro-reflected light may be increased. Further, it may be desirable that the reflected light is reflected by total 180 degrees by being reflected by 90 degrees whenever the reflected light is totally reflected in order to secure the straightness of the retro-reflected light.

Figure 8:
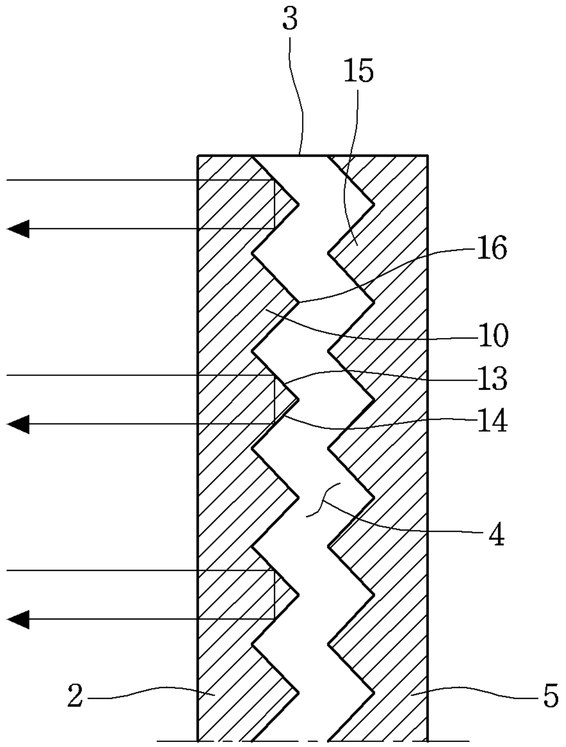
FIGS. 8 and 9 are diagrams for describing a transmissible state and a non-transmission state, respectively.
Figure 9:
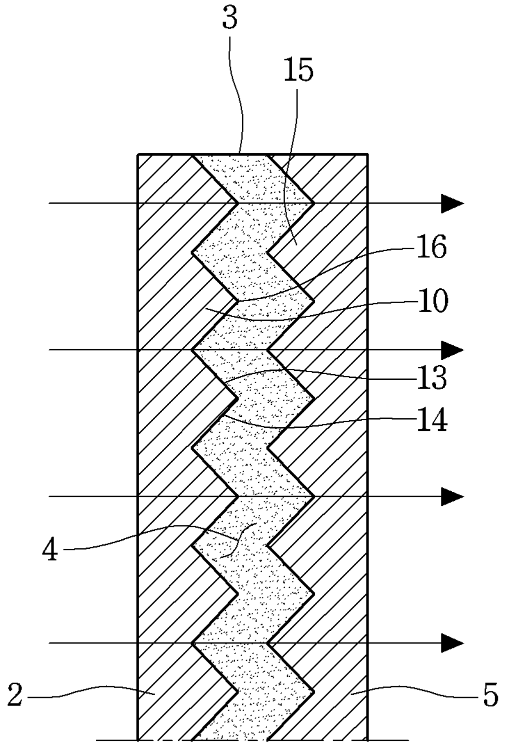

FIGS. 8 and 9 are diagrams for describing a transmissible state and a non-transmission state of a selective retro-reflection apparatus, respectively.

First, referring to FIG. 8, when the selective retro-reflection apparatus 1 is in the non-transmission state, the air may fill the fluid pocket 4. In this case, since the incident light is totally reflected at the interface between the incident panel 2 and the fluid pocket 4, the total reflection may be performed as represented in an arrow. Further, when a portion of the light in which the incident angle is different passes through the interface between the incident panel 2 and the fluid pocket 4 due to diffusivity of the light, the incident light may be again retro-reflected toward the incident panel since the total reflection occurs at interface between the emitting panel 5 and the fluid pocket 4. In this case, the retro-reflected light 121 may be used as the low beam together with the light directed downward 110. Accordingly, the low beam may have high light efficiency.

Referring to FIG. 9, when the selective retro-reflection apparatus 1 is in the transmissible state, the water or another fluid may fill the fluid pocket 4. In this case, there may be no total reflection at the interface between the incident panel 2 and the fluid pocket 4, the incident light may be transmitted and refracted according to a predetermined refractive index, and the refracted light may be recovered as an original incident angle of the incident light by being again refracted at the interface between the fluid pocket 4 and the emitting panel 5. In this case, the light penetrating the selective retro-reflection apparatus 1 may perform a function of the high beam as the light directed upward 120. Meanwhile, it may be desirable that the reflection structure 10 of the incident panel 2 and a reflection structure 15 of the emitting panel 5 are arranged to have the same shape in horizontal and vertical directions so that the incident angle of the incident light incident to the incident panel 2 is maintained as an emitting angle of the emitting panel 5 as it is.

According to the third embodiment, light luminance and energy efficiency problems, a manufacturing cost problem, a heating problem, a space problem, a noise problem may be improved at the same time.

Meanwhile, it may be desirable that a liquid is not remained on the surfaces of the reflection structures 10 and 15 in a state in which the fluid which is the liquid is exhausted by doing a hydrophobic coating on the reflection structures 10 and 15. The fluid filling the fluid pocket 4 may be another material such as alcohol and a mixture thereof besides the water. Preferably, it may be desirable that the fluid does not form a gas bubble according to a pressure and a flow, is not attached to the surface of the panel, and is a material having high transparency.

Figure 10:
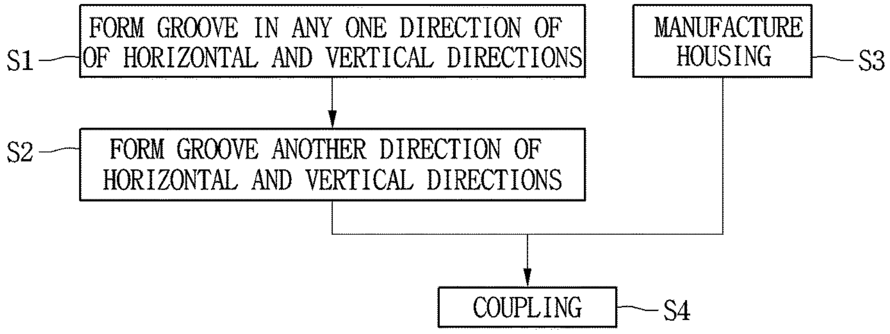
FIG. 10 is a flowchart for describing a method of manufacturing a selective retro-reflection apparatus.

FIG. 10 is a flowchart for describing a method of manufacturing a selective retro-reflection apparatus.

Referring to FIG. 10, a groove in which a cross section in any one direction of the horizontal and vertical directions has a triangle shape (preferably, a cross-sectional shape is an isosceles triangle of 45 degrees) may be formed in any one surface of a transparent panel (S1). A groove in which a cross section in another direction of the horizontal and vertical directions has a triangle shape may be formed in any one surface of the transparent panel (S2). These processes may be provided to each of the incident panel 2 and the emitting panel 5.

A housing may be formed separately with the process of manufacturing the panel (S3), and the selective retro-reflection apparatus 1 may be manufactured by providing the fluid pocket 4 by coupling the incident panel 2 and the emitting panel 5 to the housing 3. At this time, it may be possible to further combine a fluid suction apparatus and a fluid emission apparatus in a predetermined shape.

Fourth Embodiment

A fourth embodiment of the inventive concept may be equal to the third embodiment except that the reflection structure is not provided to the emitting panel 5. Preferably, the fourth embodiment may be a method which can be further considered when it is difficult to form a predetermined reflection structure in the panel.

Figure 11:
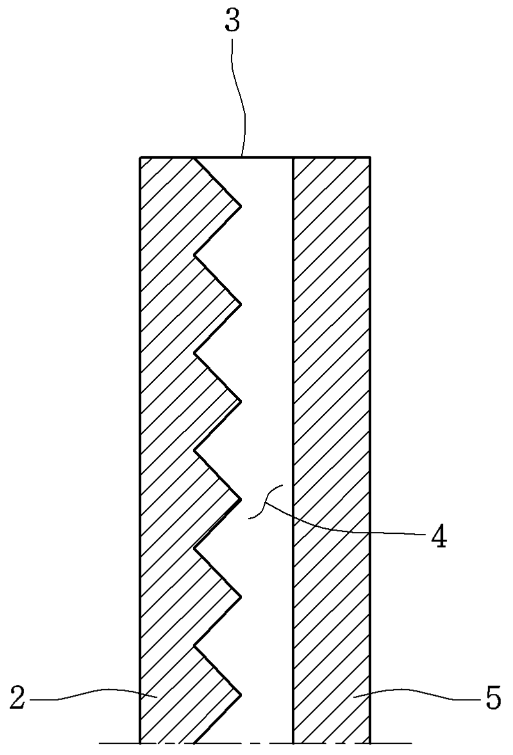
FIG. 11 is a diagram illustrating a cross-sectional view of any one portion of a selective retro-reflection apparatus according to a fourth embodiment.

FIG. 11 is a diagram illustrating a cross-sectional view of any one portion of a selective retro-reflection apparatus according to a fourth embodiment.

Referring to FIG. 11, like the third embodiment, the reflection structure 10 may be formed in the incident panel 2, but the reflection structure may not be formed in the emitting panel 5. In this case, when the selective reflection apparatus 1 is manipulated as the transmissible state, since the incident light may be refracted and a predetermined amount of the light may be reflected from the interface between the emitting panel 5 and the fluid pocket 4 or the refractive index may be overly twisted, and thus desired emitting light in which the straightness is high may not be obtained. However, it may occur only in a portion of the light and most of the light passing through the emitting panel 5 may proceed straight. Accordingly, there may not be a big obstacle to implement the concept of the selective retro-reflection apparatus according to the fourth embodiment of the inventive concept, and it may be preferably used when the effect of the retro-reflection is important and a low manufacturing cost is needed.

The lighting system of the inventive concept may improve the noise problem and the space problem, increase the emotional satisfaction of the consumer, and improve the design limitation factor of the vehicle. Further, according to embodiments, the heating problem, the luminance problem, the energy efficiency problem, and the manufacturing cost problem may be improved. The technology of the inventive concept may increase the use and spread of the lighting system by further upgrading the lighting system. The selective retro-reflection apparatus of the inventive concept may be applied to various fields in which functions of the transmission and the retro-reflection are required like the lighting system for the vehicle. Further, there may be advantages in which the straightness of the light is great in the transmissible state, and shield performance in the non-transmission state is great. Moreover, industrial applicability may be increased due to a low manufacturing cost and a simple manipulation.

What is claimed is:

1. A lighting system, comprising:

a lamp;

a reflector configured to reflect light emitted by the lamp;

a projection lens configured to emit the reflected light of the reflector in a predetermined direction; and a selective shield apparatus disposed between the projection lens and the reflector and provided on a path of light directed upward among the light reflected from the reflector to selectively shield the light directed upward, wherein the selective shield apparatus includes a selective retro-reflection apparatus, wherein the selective retro-reflection apparatus includes:

an incident panel including at least one reflection structure capable of reflecting incident light;

a fluid pocket provided on a lower portion of the incident panel along a light path of the incident light, and configured to adjust a state of an interface between the at least one reflection structure and the fluid by selectively filling fluids that are different from each other; and a structure configured to provide and emit the fluid to the fluid pocket, wherein a refractive index of the incident panel is different from a refractive index of fluid.

2. The lighting system according to claim 1, wherein the at least one reflection structure has a vertex projected toward the fluid pocket.

3. The lighting system according to claim 1, wherein the at least one reflection structure includes a plurality of structures arranged with a same interval in horizontal and vertical directions.

4. A selective retro-reflection apparatus, comprising:

an incident panel having at least one reflection structure capable of reflecting incident light;

a fluid pocket provided on a lower portion of the incident panel along a light path of the incident light, and configured to adjust a state of an interface between the reflection structure and the fluid by selectively filling fluids that are different from each other;

an emitting panel provided on a lower portion of the fluid pocket with respect to the incident light; and a structure configured to provide and emit the fluid to the fluid pocket, wherein a refractive index of the incident panel is different from a refractive index of fluid.

5. The selective retro-reflection apparatus according to claim 4, wherein the reflection structure has a vertex projected toward the fluid pocket.

6. The selective retro-reflection apparatus according to claim 4, wherein the reflection structure includes at least three reflection surfaces sharing a vertex.

7. The selective retro-reflection apparatus according to claim 4, wherein the reflection structure includes four reflection surfaces inclined by 45 degrees.

8. The selective retro-reflection apparatus according to claim 4, wherein the reflection structure includes a plurality of structures arranged with the same interval in horizontal and vertical directions.

9. The selective retro-reflection apparatus according to claim 4, wherein the reflection structure is provided in a front surface of the emitting panel.

10. The selective retro-reflection apparatus according to claim 4, wherein the reflection structure of the incident panel and the reflection structure of the emitting panel have the same shape and are arranged to have the same arrangement.

11. A lighting system, comprising:

a lamp;

a reflector configured to reflect light emitted by the lamp;

a projection lens configured to emit the reflected light of the reflector in a predetermined direction; and a selective retro-reflection apparatus provided on a light path of light directed upward so that light emitted as the light directed upward among the light emitted from the lamp is emitted as light directed downward, wherein the selective retro-reflection apparatus includes:

at least one panel having at least one reflection structure capable of reflecting incident light; and a fluid pocket configured to adjust a state of an interface between the reflection structure and the fluid, and adjust a reflection state of the incident light by alternately filling two kinds of fluids that are different from each other.

* * * * *